United States Patent [19]
Marion et al.

[11] 3,983,842
[45] Oct. 5, 1976

[54] PEANUT HULL ANIMAL LITTER

[75] Inventors: James E. Marion, Chamblee; William J. Lehmberg, Sr., Tucker; Donald H. Sherwood, Talmo, all of Ga.

[73] Assignee: Gold Kist Inc., Lithonia, Ga.

[22] Filed: Mar. 14, 1975

[21] Appl. No.: 558,291

[52] U.S. Cl. ................................................... 119/1
[51] Int. Cl.² ........................................ A01K 29/00
[58] Field of Search ......................................... 119/1

[56] References Cited
UNITED STATES PATENTS

| | | |
|---|---|---|
| 3,059,615 | 10/1962 | Kuceski et al. .......................... 119/1 |
| 3,286,691 | 11/1966 | McFadden .............................. 119/1 |
| 3,735,734 | 5/1973 | Pierce et al. ............................ 119/1 |
| 3,747,564 | 7/1973 | Bickoff et al. .......................... 119/1 |
| 3,789,797 | 2/1974 | Brewer .................................... 119/1 |
| 3,921,581 | 11/1975 | Brewer .................................... 119/1 |

*Primary Examiner*—Louis G. Mancene
*Assistant Examiner*—Peter K. Skiff
*Attorney, Agent, or Firm*—Bacon & Thomas

[57] ABSTRACT

The present invention provides an animal litter which has as its major ingredient peanut hulls, and as an odor suppressor, sodium bicarbonate.

10 Claims, No Drawings

PEANUT HULL ANIMAL LITTER

BACKGROUND OF THE INVENTION

1. Field of Invention

Animal litter prepared for household pets and laboratory animals has been marketed for several years and has found wide acceptance. The size of the available market is considerable when it is considered that the potential market for cat litter alone in the United States is about 1.3 pounds of litter per capita of human population annually.

As is to be appreciated, more leeway can exist in the type of material acceptable for laboratory animals and household pets when the litter is of the non-contact type, whereas strict controls must be maintained with direct contact litter. With non-contact litter, absorbent properties, odor and dust control, price and ease of litter disposal are of prime importance. In addition to these factors, other things such as lack of nutritive value or attractiveness as feed, and absence of skin irritant properties are important in contact litters. Further, it is important to consider the cost of raw materials, basic absorbent properties of the litter in relation to weight, resource allocation such as whether or not the raw materials have to be produced, as in the case of alfalfa, or mined and treated as in the case of clay.

2. Prior Art

Generally known litter compositions are either compositions containing large amounts of clay or natural grass compositions containing a natural grass such as alfalfa. Alfalfa containing compositions contain compressed alfalfa for absorbing liquid. The alfalfa contains chlorophyll which also acts as an odor suppressant. The patent ot Bickoff et al. U.S. Pat. No. 3,747,564 shows one such composition. The McFadden U.S. Pat. No. 3,286,691 discloses an alfalfa containing composition which may also contain a clay such as bentonite. One particular method for preparing a clay-alfalfa litter composition is disclosed in U.S. Pat. No. 3,789,979 of Brewer. While the alfalfa or grass contains chlorophyll which acts as an odor suppressant, the alfalfa has a strong odor itself, particularly when wet, and may smell like "silage" which renders its use unacceptable for many applications, particularly in confined areas, such as apartments and the like.

The use of many conventional litter materials is somewhat objectionable in that they fail to sufficiently suppress odors caused by the liquid waste materials or they possess distinct odors of their own. As noted, one method suggested by the prior art to reduce this problem is by the addition of an odor controlling agent such as chlorophyll.

U.S. Pat. No. 3,735,734 describes an odor suppressing litter material which contains a combination of a synthetic chlorophyll containing compound and an odor inhibiting additive such as sodium dihydrogen phosphate. In addition, this patent describes the use of a large number of substances commonly used as litter materials for animals. Such substances include peanut hulls. However, as further noted in the patent, it has been found that peanut hulls are too light and are easily kicked out of an animal commode or tracked about the premises by the animal thus rendering them unsatisfactory. The Peanut Journal and Nut World Volume XIV, No. 4., February 1975, pages 15 and 16 also refers to the use of peanut hulls as a poultry litter and proposed animal litter.

SUMMARY OF THE INVENTION

One object of this invention is to provide an animal litter which comprises as its chief ingredient a by-product which must otherwise be disposed of in a manner to meet existing environmental regulations.

Another object of the invention is to provide a litter that has properties superior to existing animal litter for use with household pets, especially cats, and for a number of laboratory animals.

A still further object of the invention is to provide a litter which controls odor and thereby has an extended life.

These and other objects as hereinafter become apparent are achieved by an animal litter which comprises as the chief ingredient compressed peanut hulls.

DESCRIPTION OF PREFERRED EMBODIMENTS

Attempts have hitherto been made to use peanut hulls as an animal litter. These attempts have proven to be unsatisfactory as indicated in U.S. Pat. No. 3,735,734 wherein it is stated that peanut hulls are too light and are easily kicked out of an animal commode or tracked about the premises by the animal.

It has now been discovered that by grinding peanut hulls by conventional techniques, such as by a hammermill, to a size which will pass a screen mesh of between 1/16 and ¼ inch, preferably about 5/32 of an inch and then pelletizing the thus ground hulls an absorbent pelleted animal litter is produced having a sufficient density so as not be be readily displaced from the litter containing container by the animal. The litter also has sufficient density so as to avoid any significant tracking problem.

The ground peanut hulls may be pelletized using conventional techniques for pelleting animal feeds. Conventional pelleting aids may be used, such as clay, with bentonite clay being particularly preferred. The amount of pelleting aid used is about 1 to 5%. Preferably, the pelleting aid used constitutes about 2% of the litter. The pellets formed by using these techniques are obtained in a convenient size for direct use as an animal litter by cutting the pellet into lengths of about from ⅛ inch to about ½ inch. The size of the pellet will of course depend upon the size of the animal which will use the litter, the larger the aniaml the larger the pellet size. A particularly preferred size is about ⅛ by ⅛ inch.

In addition to the pelleting aid it is preferred to add an odor suppressor to extend the useful life of the litter. Other substances may also be added as filler, such as a fibrous substance, which includes grass. However, the amount of peanut hulls used must be between from about 60, preferably from about 80 and most preferably from about 90 to 98% to obtain the objects of the invention. The peanut hulls are mixed with the desired additives of proper size and the mixture pelletized.

Basic substances such as sodium bicarbonate, calcium carbonate, tri sodium phosphate, sodium carbonate may be used in an amount which is effective to suppress odors and extend the useful life of the litter and are thus effective odor suppressors. Sodium bicarbonate is particularly preferred as an odor suppressor. The amount of the above odor suppressor contained in the litter composition should be from about 0.5 to 8%, preferably from 1–6% based on odor suppression and water absorption. In addition, known odor suppressors may be added such as natural grasses and the like. Thus the filler which may replace a portion of the peanut hulls may be a natural grass such as alfalfa thereby obviating the need for an additional odor suppressor. However, in no case should the amount of natural grass contained in the composition be sufficient to produce a "silage" odor in the composition.

EXAMPLE 1

Three animal litter formulations were prepared as follows: finely ground peanut hulls (hammermilled through a 5/32 inch screen) were mixed with the ingredients as indicated below. Each formula was mixed well in a horizontal ribbon blender and then pelleted through a California Pellet Mill (Mod. 50248, 30 hp). A die size of 5/32 inch was used and pellets of appropriate size for use directly as an animal litter were obtained.

The effectiveness of these animal litter formulations were evaluated by both laboratory tests and actual use. In the laboratory tests formulation No. 1 was compared to alfalfa and clay pellets to determine moisture absorption with the result that formula 1 absorbed 288% moisture, alfalfa pellets 402% and clay 126% indicating the high moisture absorption of formulation No. 1 without the objectionably strong alfalfa odor present in the pure alfalfa pellets.

The formulations (No. 1, 2 and 3) were also compared to the commercially available litters Sani-Cel which is ground corn cobs manufactured by Paxton Processing Corp., Paxton, Illinois, and Ab-Sorb-Dri manufactured by Ab-Dri Inc., Garfield, New Jersey which is hardwood shavings. The results are shown in table I.

TABLE I

| Comparisons Among Experimental Peanut Hull Beddings, Sani-Cel and Ab-Sorb-Dri | | | | | |
|---|---|---|---|---|---|
| Characteristic | Formula No. 1 | Formula No. 2 | Formula No. 3 | Sani-Cel | Ab-Sorb-Dri |
| Quantity Used (g) Contact Use (Guinea Pigs)[1] | 800 | 800 | 800 | 440 | 250 |
| Non-contact use (Cats) | 454 | 454 | 454 | — | 454 |
| Absorption (Urine) Contact Use: Guinea Pigs 2/cage (20"×16"×8½" high) | Good (Caking) | Good (Caking) | Good (Little Caking) | Poor | Poor |
| Non-contact Use: Cats 1/cage (18"×24"×30") | Fair-Good | Fair-Good | Fair-Good | Poor | Poor |
| Fining and Dust[2] Contact Use: Guinea Pigs 2/cage (20"×16"×30") | Mostly Pulverized | Some Pulverized | Little Pulverized | Some Pulverized | None Pulverized |
| Non-contact Use: Cats 1/cage (18"×24"×30") | Pellets Retained Some Shape | Pellets Retained Little Shape | Pellets Retained Very Little Shape | — | — |
| Staining Animals | None | None | None | Some (Probably from Manure) | None |
| Caging | None | None | None | | None |
| Attractiveness as Feed | Little (Initially Curiosity Item) | Little | Little | Little | None |

[1]All beddings in equal volume to cover cage bottom for 5½ days.
[2]Experimental pellets not usual size; ave. ½" long. Therefore, durability test not conducted.

| Ingredient | Formula No. 1 | Formula No. 2 | Formula No. 3 |
|---|---|---|---|
| Peanut hulls wt.% | 83 | 73 | 81 |
| Alfalfa meal wt.% | 15 | 25 | 15 |
| Bentonite clay, wt.% | 2 | 2 | 2 |
| Corn oil wt.% | 0 | 0 | 2 |

As can be seen from these formulations the peanut hulls are used in a range of from about 70 to 85% and the alfalfa in a range of about 15 to 25%.

As can be seen from Table I, the litters of the present invention were found overall superior compared to Sani-Cel and Ab-Sorb-Dri.

EXAMPLE 2

The procedure of Example 1 was followed using 98% ground peanut hulls and 2% bentonite clay to form formulation No. 4. Comparisons were made with this formulation and Sani-Cel, Ab-Sorb-Dri and wood shavings. The results are reported in Table II.

TABLE II

| Comparisons Among Experimental Peanut Hull Bedding, Sani-Cel, Ab-Sorb-Dri and Wood Shavings | | | | |
|---|---|---|---|---|
| Characteristic | Formulation No. 4 | Sani-Cel | Ab-Sorb-Dri | Wood Shavings |
| Quantity Used (g) Non-contact (cats)[1] | 1362,671 | | 1362,671 | 227 |
| Contact use (guinea pigs)[2] | 850,425 | 450,225 | 300,150 | |
| Absorption Non-contact (1 cat/ 18"×24"×30" high cage) | Good | — | Good-Fair | Fair-Good |
| Contact (2 guinea pigs/ 20"×16"×8½" high cage) | Good | Fair-Good | Good-Fair | — |
| Odor Control Non-contact | Good | — | Good-Fair | Good-Fair |

TABLE II-continued

Comparisons Among Experimental Peanut Hull Bedding, Sani-Cel, Ab-Sorb-Dri and Wood Shavings

| Characteristic | Formulation No. 4 | Sani-Cel | Ab-Sorb-Dri | Wood Shavings |
|---|---|---|---|---|
| Contact Fining and Dust | Good | Good-Fair | Good-Fair | — |
| Non-contact | No dust initially, pellets loose shape as moisture absorbed. | — | Slightly dusty initially. | Slightly dusty initially. |
| Contact | Pellets crumble from footwork; and after moisture is absorbed and then become dry. | Some crumbling and then packs down with accumulating moisture. | Particle integrity maintained; little fining or dust. | |
| Staining | | | | |
| Animals | None | None | None | — |
| Caging | None | None | None | — |
| Attractiveness as Feed | None | None | None | — |

[1] 5-days use
[2] 6-days use

As can be seen by comparing the results shown in Table II, with those shown in Table I, the litter formulation without alfalfa was as good or better than formulations 1, 2 and 3. However, there is some tendency for these pellets to crumble with use.

EXAMPLE 3

The procedure of Example 1 was followed to prepare the formulations as indicated in the following Table III, except that sodium bicarbonate was added where indicated as an odor suppressor.

TABLE III

| Formula No. | % Composition | | | | |
|---|---|---|---|---|---|
| | Peanut Hulls | Alfalfa | Bentonite Clay | Fat | NaHCO$_3$ |
| 5 | 98 | 0 | 2 | 0 | 0 |
| 6 | 95 | 0 | 5 | 0 | 0 |
| 7 | 97 | 0 | 2 | 0 | 1 |
| 8 | 96 | 0 | 2 | 0 | 2 |
| 9 | 96 | 0 | 2 | 2 | 0 |
| 10 | 93 | 0 | 2 | 5 | 0 |
| 11 | 0 | 98 | 2 | 0 | 0 |

Water absorption values were obtained in the same manner as in Example 1. However, less total absorption occurred than in Example 1. On two-hour absorption tests Formula 5 absorbed 216%, 6) 246%, 7) 218%, 8) 224%, 9) 230%, 10) 242%, 11) 349%. Shop-rite, K-Mart, and Litter Green brands of alfalfa absorbed 319,307 and 356% respectively. Overnight absorption values were higher than the 2 hour values but not as high as those of Example 1. However, the same relative differences were obtained for 2-hour and overnight absorption values.

After running absorption values, wet samples were left from Friday until Monday at room temperature. Alfalfa samples generally had more objectionable odor than either of the peanut hull samples with Formula 8 having the most desirable odor (slightly sweet). Pellet integrity (ability to hold together wet) was checked on all formulas and found to be best for Formulas 7 and 8, both of which contained NaHCO$_3$. Additional observations were made on "tracking" problems and all products tended to "track" when "fingerprinted" onto dark cloth. However, alfalfa products were judged to be a real problem due to the "grass-type" stain transferred onto cloth after the product was wet.

EXAMPLE 4

Formulations were prepared in accordance with the procedure of Example 1, using the ingredients as indicated in Table IV.

TABLE IV

A. Physical Data

| Formula No. | Peanut Hulls | % Composition | | Absorption % H$_2$O Uptake |
|---|---|---|---|---|
| | | Bentonite Clay | NaHCO$_3$ | |
| 12 | 97.5 | 2 | 0.5 | 326 |
| 13 | 97 | 2 | 1 | 337 |
| 14 | 96 | 2 | 2 | 314 |
| 15 | 94 | 2 | 4 | 266 |
| 16 | 90 | 2 | 8 | 201 |
| 17 | 98 (Alfalfa) | 2 | 0 | 384 |
| 18 | Commercial Litter Green | | | 389 |
| 19 | 96 | 2 | 2 | 273 |

Odor Data

| Formula No. | % NaHCO$_3$ | Rank (1 best) | Odor Comments[1] |
|---|---|---|---|
| 15 | 4 | 1 | a |
| 13 | 1 | 2 | b |
| 19 | 2 | 3 | c |
| 14 | 2 | 4 | d |
| 12 | 0.5 | 5 | e |
| 16 | 8 | 6 | f |
| 17 | Alfalfa 98% | 7 | g |
| 18 | Comm. Litter Green | 8 | h | a. No odor
b. Sweet, slightly grassy
c. Sweet, slightly grassy, slightly ammonia
d. Sweet, slightly grassy, slightly ammonia
e. Slightly grassy, slightly ammonia, slightly putrid
f. Slightly grassy, slightly ammonia, slightly putrid
g. Strong grassy odor, strong ammonia
h. Very strong grassy odor, strong ammonia All values expressed as % are % by weight unless otherwise indicated.

The litter compositions of this invention are particularly useful as a cat litter.

We claim:

1. A pelleted animal litter composition comprising from about 60 to 98% compressed peanut hulls, a pelleting aid such as clay and a basic odor suppressor such as sodium bicarbonate, calcium carbonate, tri sodium phosphate, and sodium carbonate.

2. The animal litter composition of claim 1 wherein the odor suppressor is present in an amount of from 0.5 to 8% by weight.

3. The animal litter composition of claim 1, wherein the odor suppressor is selected from the group consisting of sodium bicarbonate, calcium carbonate, trisodium phosphate, and sodium carbonate.

4. The animal litter of claim 1, wherein the odor suppressor is present in an amount of from 1.0 to 6%.

5. The animal litter composition of claim 1, wherein the odor suppressor is sodium bicarbonate, and the pelleting aid is bentonite clay.

6. The animal litter of claim 1, wherein the peanut hulls are present in an amount of from about 80 to 98% by weight.

7. The animal litter of claim 1, which also contains alfalfa as a filler and odor suppressor.

8. The animal litter of claim 1, which is 94% peanut hulls, 2% bentonite clay, and 4% sodium bicarbonate.

9. The animal litter of claim 1, which is 97% peanut hulls, 2% bentonite clay and 1% sodium bicarbonate.

10. A substantially non-acidic pelleted animal litter composition comprising from about 60 to 98% compressed peanut hulls, a pelleting aid such as clay and an odor suppressor such as sodium bicarbonate, calcium carbonate, tri sodium phosphate, and sodium carbonate.

* * * * *